Sept. 6, 1966  J. R. JOHNSON ETAL  3,270,710
DIP-COATING MACHINE
Original Filed Aug. 21, 1959  3 Sheets-Sheet 1
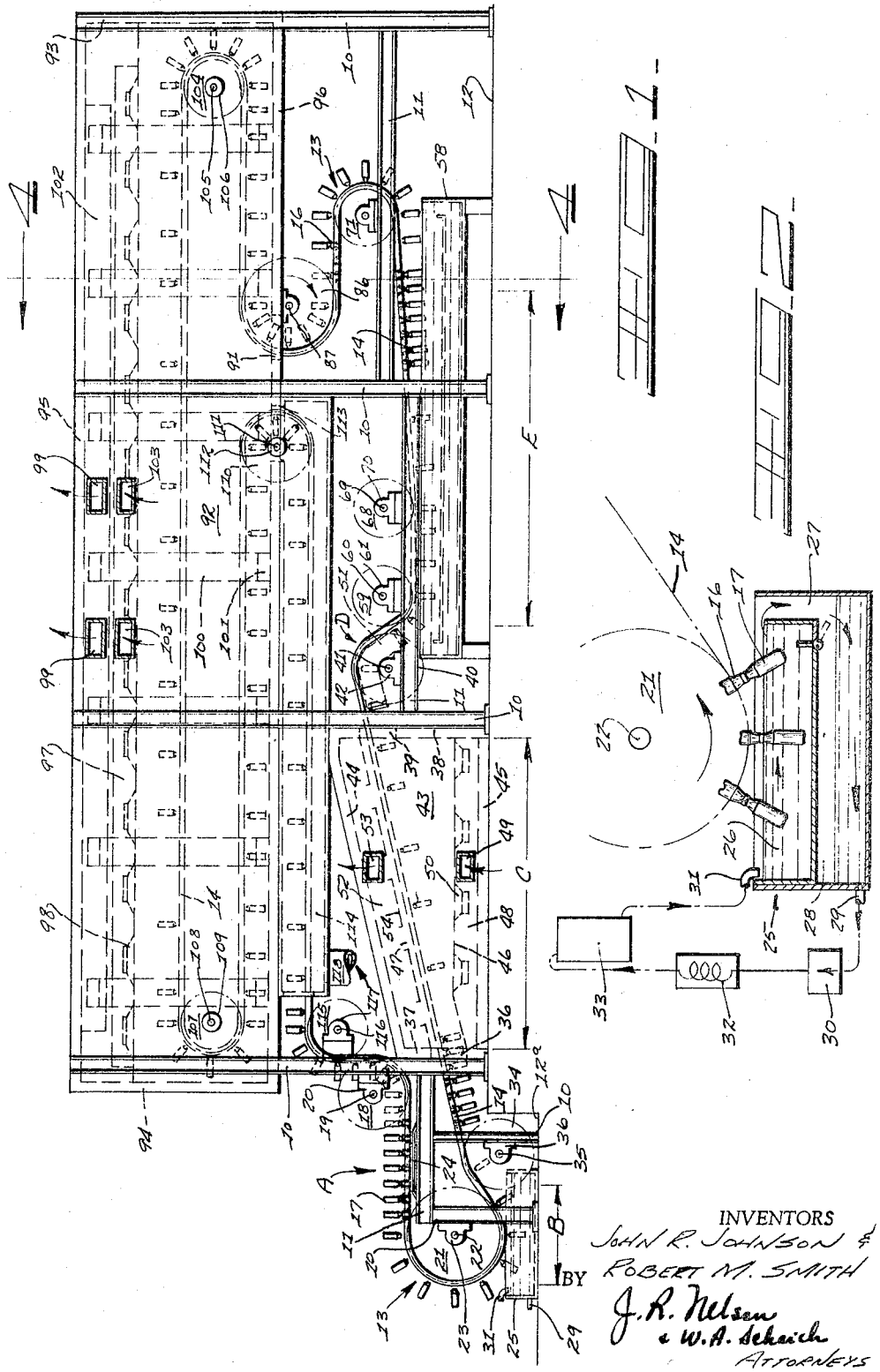
INVENTORS
JOHN R. JOHNSON &
ROBERT M. SMITH
BY J. R. Nelson
& W. A. Schaich
ATTORNEYS

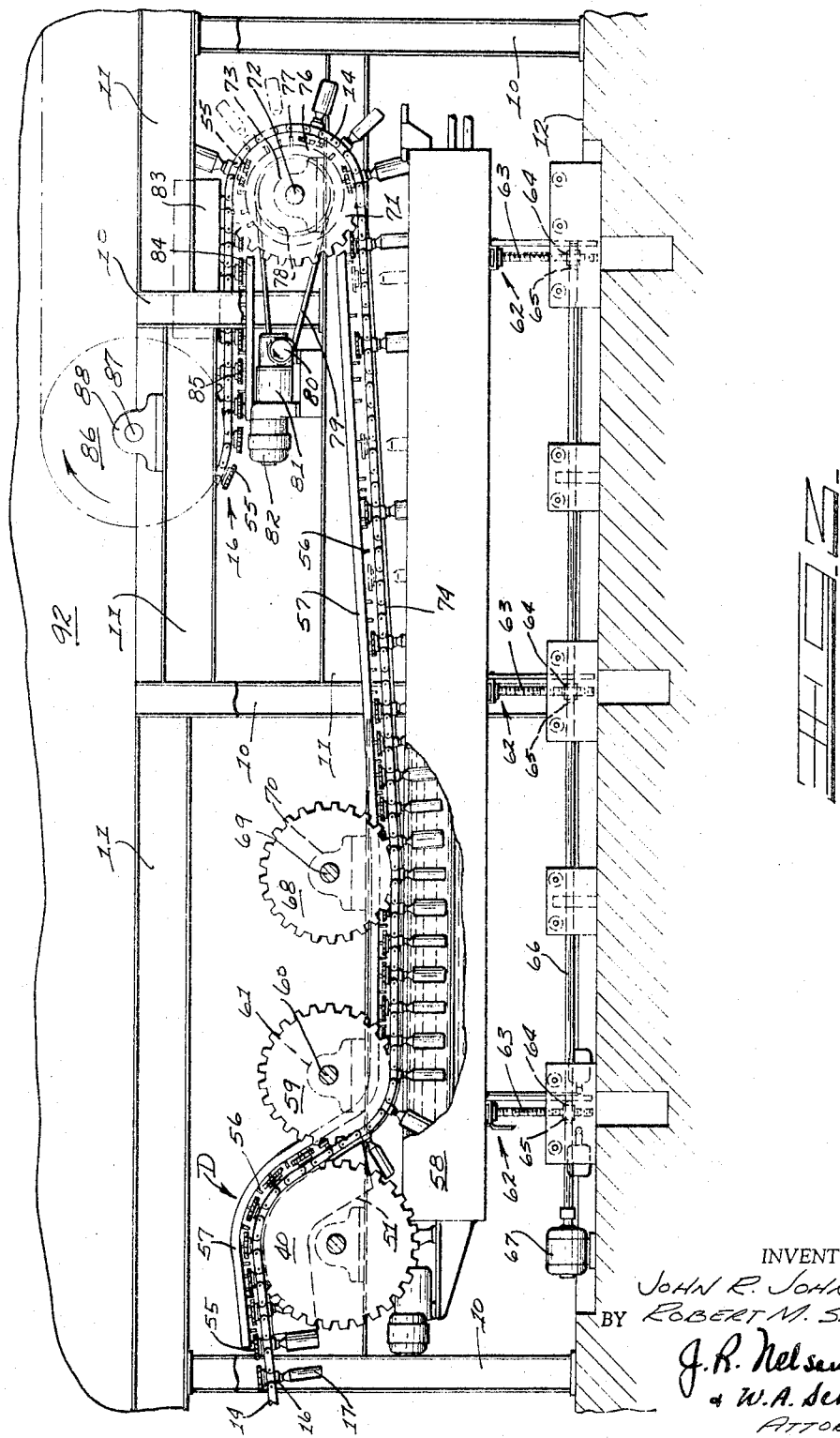

Sept. 6, 1966  J. R. JOHNSON ETAL  3,270,710
DIP-COATING MACHINE
Original Filed Aug. 21, 1959  3 Sheets-Sheet 3
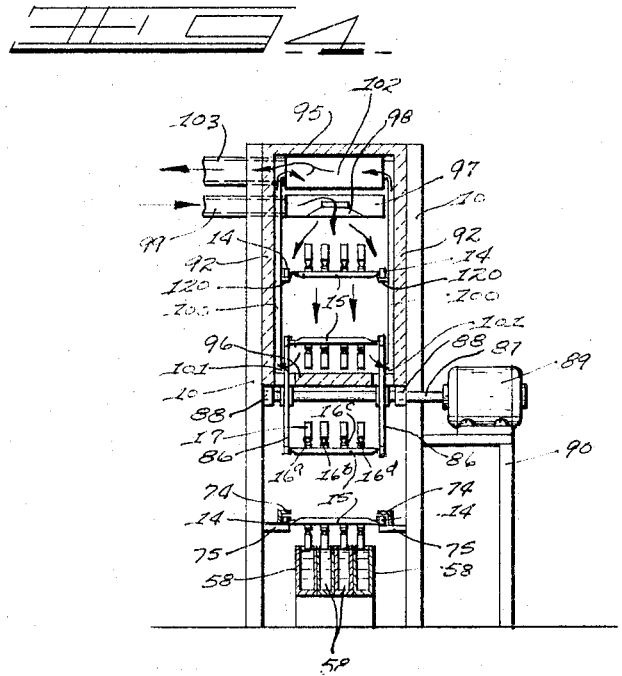
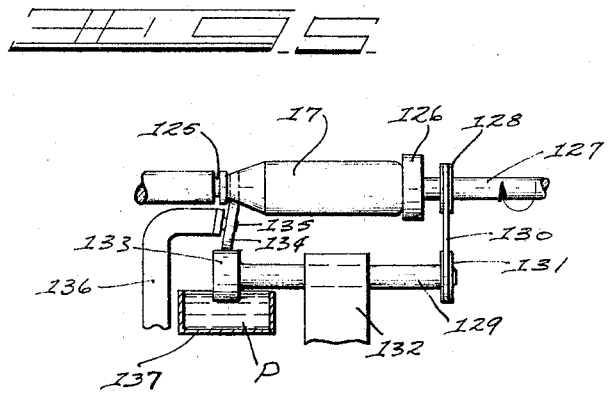
INVENTORS
JOHN R. JOHNSON &
BY ROBERT M. SMITH
J. R. Nelson
+ W. A. Schaich
ATTORNEYS

United States Patent Office 3,270,710
Patented Sept. 6, 1966

3,270,710
DIP-COATING MACHINE
John R. Johnson and Robert M. Smith, Toledo, Ohio, assignors to Owens-Illinois, Inc., a corporation of Ohio
Continuation of application Ser. No. 835,360, Aug. 21, 1959. This application Sept. 5, 1962, Ser. No. 224,591
4 Claims. (Cl. 118—56)

This application is a continuation of Serial Number 835,360 filed August 21, 1959, now abandoned.

The present invention relates to a continuous process machine for applying a coating of a plastic material to the exterior surface of glass articles, such as a glass bottle, and produce a package useable as an "aerosol" container.

Presently, the packaging of perfume, hair dressings, and other cosmetics, insecticides, lacquers, and many other liquid commodities, are more and more being made in "aerosol" containers. However, a majority of aerosol containers presently available on the market are made of metal. The reason for this is obvious since this type container is expected to hold a fluid under considerable pressure for long periods of time and during use. The nature of some products, such as the mentioned cosmetics, require that the container possess chemically inert properties to resist chemical contamination or reaction with the content. In aerosol containers, the content is placed therein and sealed under a positive pressure. The sealing is effected by a valve which also serves to dispense desired quantities of the content. In relation to the referred-to type of packaged content, as well as many others, glass containers possess the inert qualities best suited to alleviate chemical attack or corrosion. However, glass being generally recognized as a fragile material, a glass aerosol package requires some form of strengthening or a protective outer coating to remove this hazard.

Containers of this type have been made recently by coating a bare glass bottle with a plastic, such as a polyvinyl chloride (PVC) material, and filling the container with the fluid content under pressure. This plastic material, when applied evenly and smoothly in a satisfactory manner, presents an attractive package and a package that is functional as a glass aerosol container. Furthermore, such a coating is resilient and will absorb physical shocks that may otherwise tend to break and shatter an unprotected glass bottle. The filled container is capped and sealed by a dispenser valve assembly applied to the bottle neck. However, one of the understandable problems present in such an aerosol package resides in the ever present danger of breakage of the inner glass wall. Breakage of the glass may be in such a manner that fragmentation will occur and the protective outer coating of the PVC material will rupture. Once the PVC envelope is opened or severed, the fragments of glass will be free to separate, and, due to the pressure of the packaged content, the glass fragments thrown a considerable distance and with considerable force.

It is, therefore, an object of the present invention to provide a machine for the continuous production of an improved plastic coated glass bottle for use as an aerosol package, wherein the bottle is first treated by priming its glass surface with a primer material prior to application of the protective plastic coating and then coated with a plastic material, the resultant coated bottle having a plastic coating that is tenaciously adhered to the glass, and, thus, will overcome the foregoing disadvantage of shatterable glass fragments, should the aerosol package be broken in use and while pressurized.

A further object of the invention is the provision of a machine for coating glass articles with a plastic, such as those mentioned, continuously in an efficient, rapid and economical manner and the coating applied in such a manner that the articles are smoothly and accurately coated to produce an attractive package.

Another object of the invention is to provide a production machine for continuously coating glass bottles, and other glass articles, with a plastic material and capable of high rates of production, yet efficient to operate and having flexibility of production such that a number of different types or sizes of articles may be produced concurrently having different colors or types of plastic coatings applied, or a number of different types or sizes of articles may be produced concurently having the same plastic coating applied or but a single type or size of article coated with different colors or types of plastic coatings may be concurrently produced, or a single type or size of article coated with the same type of plastic and color coating may be concurrently produced.

In conjunction with the production of plastic coated glass bottles for use as aerosol packages, it has been found that in effectively priming the glass surfaces of the bottle so as to tenaciously adhere the subsequently applied plastic coating, certain advantages may be obtained by providing unbonded areas between the plastic coating and the bottle, so that in these areas the plastic is separable from the glass. One of the advantageous uses found for this latter type production of such plastic coated bottles is a provision for visual detection of leaks in an aerosol package. If leaks should occur, such as by fracture of the glass wall in an area adjacent an unbonded area, the pressurized fluid in the aerosol may enter between the plastic coating and the glass wall of the bottle at this unbonded area causing the coating to bulge by inflation.

The above objects as well as other objects and advantages of the invention will be apparent to those skilled in the art from the following detailed description, taken in conjunction with the annexed sheets of drawings, on which there is presented, for purposes of illustration only, a preferred and practical embodiment of the invention.

On the drawings:

FIG. 1 is a side elevational view of the plastic coating machine of the present invention;

FIG. 2 is a sectional view of the primer dipping tanks of the machine and includes a diagrammatic illustration of the viscosity-temperature controls for maintaining the primer in condition for application to the prepared bottles by dipping them into and out of the bath of primer therein;

FIG. 3 is an enlarged fragmentary side elevational view, partially broken away, illustrating in greater detail the individual dipping tanks employed in which is maintained a bath of the plastic coating material at proper viscosity-temperature conditions for applying the coating to the bottles by dipping and includes also that portion of the machine for detearing and setting the applied coating on the bottles subsequent to removal from the bath of plastic coating material;

FIG. 4 is an end sectional elevational view, taken along lines 4—4 of FIG. 1, which shows the plurality of lines of articles simultaneously handled by the machine and FIG. 5 is a partially schematic view of apparatus capable of applying shielding material to an area of the glass bottle prior to application of the primer material such that only a selected surface area of the glass will be effectively primed.

Since one of the primary uses of this invention is in the production of plastic coated glass bottles from which a glass aerosol package may be made, it will be particularly described in that connection. However, it should be distinctly understood that the principles of this invention are equally applicable to the production of plastic coated glass articles of various types, sizes and shapes. Hence, the invention may be readily applied to production of a variety of coated items, for example, tumblers, jars, insulators, and bobbins.

In the present invention, desired plastic coated glass articles are continuously produced by the following outlined sequence of operations.

The glass bottles are brought in succession to a priming zone whereat a primer coating is applied over an area of the exterior surface as may be desired to later effect a bonding between the plastic coating applied and the adjacent glass surface of the bottle. The primer utilized may vary throughout a wide range provided, of course, it is compatible with the plastic coating material utilized in order to bond the plastic to the glass. An example of a satisfactory primer material and plastic coating material which are thusly compatable will be given hereinafter. The primer material will be applied in liquid condition at a viscosity and temperature to obtain an adequate film or primer coating on the bottle, preferably approximately one mil in thickness. The bottle may be primed while at room temperature. The active ingredients of the primer are mixed with organic solvents to obtain a fluid of a viscosity suitable to obtain the desired primer coating at a practical operating temperature, such as room temperature.

The primed bottle is next brought to a preheating chamber in the form of an oven and heated while carried therein. The preheat is conducted at a temperature that will volatilize the organic solvents of the primer coating and condition the bottle to a temperature for obtaining a desired coating of the plastic material at the time it is to be applied. Prior to coating the bottle with the plastic material, it has been found to be beneficial to apply heat to various parts of the bottle surface so as to heat zones thereof to a higher surface temperature than obtained during the preheat step. Certain areas of a bottle, due to sharp contours thereon, are more difficult to obtain a good coating. There areas occur at sharp radii at the corners of the bottle, such as at the bottom corner or a sharp shoulder corner. It is a characteristic of plastic coating materials, such as the examples of vinyl resin types given herein, that the temperature of the glass at the time the plastic coating material is applied will control the thickness of coating of the material that will gel or set up onto the surface of the glass. As soon as the surface temperature of the glass of the bottle decreases to the point where gelation will no longer occur, the thickness of the plastic coating is defined. The bottle may be heat-treated to properly condition the mentioned surfaces that are most difficult to apply the desired thickness of coating by passing the bottle after, or even during, preheating in the oven through radiant heaters which are capable of boosting the temperature of those zones of the bottle's exterior surface. Thereafter, the bottles are immediately brought to the coating zone for applying a liquid plastic coating material to form a coating over the desired surface areas. For any given plastic coating material at the given temperature and viscosity best suited for application of that material, the thickness of coating that will be obtained may be predetermined by adjusting the variable factors of the heat of the bottle and the time the coating material is applied to the bottle.

The plastic material in flowable condition is suitably applied to the surface of the botle to be coated by dipping it into a bath of the plastic in upright position and while the bottle is still in the aforementioned heated condition. After the coating is applied, any excess will be allowed to drain from the bottle. Since the plastic is still flowable during drain-off, a droplet formation will remain attached with the coating on the bottle near a lower corner or edge. This formation, if allowed to gel or set into the coating, is undesirable for obvious reasons. Hence, after drain-off and while the plastic of the coating is still in flowable condition, the coating is smoothed by eliminating this formation. This is accomplshed by rotating the bottle simultaneously about its own axis and about an axis perpendicular to the bottle axis, such as by rotating the bottle axially while inverting it through rotation about a horizontal axis. These simultaneous rotations will merge the droplet formation by flowing it smoothly about areas of plastic of the coating.

After a smooth coating is obtained by eliminating any droplet formation, the plastic of the coating is allowed to gel or set so as to be non-flowable. Axial rotation of the bottle should be continued up to this point to keep the coating smooth. This gelation may take place without supplying additional external heat by merely the heat liberated to the coating from the heat conditioned glass, but gelatation may be advantageously accelerated by applying heat while the bottle continues to move past heaters.

The plastic coating on the bottle is then ready for baking. For this purpose, the bottle is next moved through a baking oven wherein the coating is heated to form a fused plastic coating on the bottle. Upon completion of this fusion of the coating, it will be bonded to the glass throughout the underlying primed surface areas of the bottle and a tenaciously adhering finished coating will result. The finished plastic coated bottle is then moved out of the oven and cooled to handling temperature.

Different primer materials may be employed in the process. By way of example, a preferred form of primer for cooperating with the preferred form of plastic coating to be applied, as described hereinafter, and which will obtain the stated objects under this invention, is a mixture containing gamma-amino propyltriethoxy silane, epoxy resin, methyl methacrylate polymer and organic solvents, the ratio of the polymer to the resin being between 15:85 and 99:1, and the silane being present in an amount at least 0.05% by weight based on the combined solids content of the epoxy and methacrylate.

After the primer coating is applied, the preheat conditioning of the bottle is in the range of 200–400° F. This temperature range will volatilize the solvents of the primer mixture and heat the bottle sufficiently to obtain a satisfactory coating of the following vinyl resin plastic.

By way of example, a compatable plastic material for the above described primer is a vinyl resin dispersion comprising polyvinyl chloride, diisooctyl phthalate and tin mercaptide. Suitable pigment ingredients may also be added to color the material as desired.

Other vinyl resins presently available are those sold under the trade designations Geon 121, Marvinal VR51, Exon 654, Chem-O-Sol and Opalon 410, which may be used in formulation of dispersions suitable for use as the plastic material.

The foregoing example of the plastic material is best suited for application at a temperature in the range of 84° F. to 90° F. and a viscosity in the range of 5,000 to 20,000 centipoises.

With regard to the machine embodiment of the invention, it will be apparent from the following description thereof that it possesses the flexibility of operation to attain the stated objects of the invention. In this connection, the machine is provided with a plurality of lines or rows of bottle carrying chucks which are made to move in an endless path throughout the machine for performing the various treatments of the bottles called for by the process. Each line of chucks on the machine travels continuously with a moving carriage throughout a fixed path for successively conveying articles through various operating zones arranged in a sequential order. These operating zones include loading, priming, preheat, heat conditioning, coating, detearing, baking, cooling and unloading zones. At the loading, heat conditioning, coating, detearing and unloading zones, individual apparatuses are provided for each line of chucks on the machine. Thus, each line may handle different shapes or sizes or types of bottles and the bottles in different lines may be treated in a different manner to produce a variety of coated bottles simultaneously on the machine.

Although four lines of chucks are illustrated on the drawings, it should be understood that any number of lines may be constructed and accommodated on the moveable carriage within the limits of the space determined by the spacing between the carriage chains. It has been found that four lines work satisfactorily, and it is contemplated that eight lines would be practical. As will be apparent from the following description, for each line of chucks on the carriage it is preferred to provide an individual dipping tank apparatus. Flexibility of production of the machine is permitted in that different colored coatings may be run simultaneously as between the different lines, and production of a variety of shapes and sizes of bottles may be run on the different lines of the machine.

Referring to the drawings, as shown by FIG. 1, the machine is constructed for support by a frame comprised of vertical structural beams 10 and horizontal structural beams 11. The frame is anchored to the factory floor 12. As shown, the floor 12 has two elevations, one of which is at a lower level in the form of a well 12a provided to conserve head space in the factory and accommodate a loading zone A to the proper height whereat workmen may load the machine conveniently from the upper floor level. A moveable carriage, indicated generally as 13, is provided and comprises two like spaced-apart and parallel endless reaches of chain 14 (see also FIG. 4). Referring for the moment to FIG. 4, it is seen that the chains 14 have a number of similar cross members 15 end-connected to links of these chains for movement with the latter. Rotatably mounted in each of these cross-members 15 are four similar article-holding chucks 16 spaced therealong and numbered 16a, 16b, 16c and 16d. Each of the chucks 16a–16d, respectively, as between successive cross members 15, are aligned longitudinally of the chain in four longitudinal lines, thereon. Each chuck is shown holding a bottle 17 (see FIGS. 2 and 3) so as to be rotatable about its own axis. The structural details of the chucks 16 are fully set forth in my U.S. Patent 2,882,061. Accordingly, these chucks are shown herein in simplified form for ease of illustration. The means for opening and closing the chucks for attaching or releasing an article is discernible from these drawings, but, from reference to my mentioned patent, it should be readily apparent that the bottles are loaded to the lines as the plungers (not shown) of the chucks 16a–16d are depressed. The bottles 17, when loaded to the chucks, extend perpendicular to the cross members 15. A fixed path for the two carriage chains 14 is provided by pairs of sprockets all aligned vertically, one pair with the others, and strategically located on the machine and about which these chains are reeved for running engagement on the teeth of the sprockets, as will be described presently.

Beginning at the left-hand side of FIG. 1, a pair of sprockets 18 are keyed onto a horizontal shaft 19 in spaced-apart parallel relationship. The shaft 19 is bearing-mounted for rotation in conventional end journal bearings 20 bolted in place on the structural beams 10 of the machine frame. Another pair of somewhat larger sprockets 21 are keyed onto a horizontal shaft 22 in spaced-apart parallel relationship. The shaft 22 is bearing mounted for rotation in its end journal bearings 23 bolted in place on another of the structural beams 10 of the machine frame in a position to align the sprockets 21 with the respective sprockets 18. The span of the chains between the underside of sprockets 18 and the upper side of sprockets 21 extends past a loading and unloading zone A for loading and unloading bottles 17 to the chucks 16. As the chucks in the lines 16a–16d are carried through zone A by movement of the chains 14, the mentioned plungers of the chucks are carried to extend downwardly perpendicular to the underside of their cross member 15 and are depressed by riding over individual similar cams 24 mounted between the horizontal beams 11. The chucks are opened to unload and load bottles by this depressing of their plungers. Thus, the glass bottles are loaded to the carriage 13 in an inverted position. The chucks close and firmly grip the bottles at the point where the cams 24 terminate.

As the bottles are carried about the periphery of sprockets 21 they are brought to a priming zone B and, as shown, dipped into a bath of liquid primer material contained in the primer tank 25. A single tank to accommodate the four lines of chucks may be employed if the operation of the machine permits use of the same primer material. Obviously, if different primer materials are to be employed, individual tanks, as 25, will be needed.

As shown on FIG. 2, the tank 25 is a two-compartmented structure having an upper dipping compartment 26, an overflow passage 27 and a lower compartment or reservoir 28. This structure is provided to maintain the primer bath fresh and at the correct viscosity and temperature. The primer material is circulated, as shown schematically, through a system from the outlet 29 at the reservoir by a pump 30 and into a heat exchanger 32. From the heat exchanger the primer enters the viscosity control apparatus 33 wherein the desired viscosity and mixture of the primer is maintained and make-up solvent is added. From this apparatus, the properly conditioned primer is piped at 31 to the dipping compartment 26 of the tank wherein the bottles 17 are successively primer coated.

Referring again to FIG. 1, the carriage chains next pass over idler sprockets 34 rotatably mounted on the machine frame by horizontal shaft 35 and end journal bearings 36. The sprockets 34 direct the chains 14 upwardly for moving the bottles out of the primer bath and toward the entrance 36 in an end wall 37 of the preheat oven C. The opposite end wall 38 of the oven provides an exit 39. The carriage 12 extends through the entrance 36 and exit 39 and around two sprockets 40 which are rotatably mounted on horizontal beams 11 of the machine frame by horizontal shaft 41 and end journal bearings 42.

The preheating oven has opposite side walls 43, a roof 44, and a bottom wall 45. The walls 37, 38 and 43 and the roof 44 are each constructed of a suitable insulating material, such as a refractory or oven brick, to retain the heat within the oven efficiently and minimize radiation heat loss.

Overlying the bottom 45 in spaced relationship is a longitudinal wall member 46. Likewise, in underlying spaced relationship to roof 44 is a longitudinal wall member 47 of sheet metal construction. The space bounded by the side walls 43, the end walls 37 and 38, the upper wall member 47, and the lower wall member 46 comprises a central chamber for this oven. The articles to be heat-treated, as may be seen from the foregoing, are conveyed longitudinally of this chamber by the carriage 13 moving therethrough.

The space defined between the side walls 43, the end walls 37 and 38, the bottom 45, and the lower wall member 46 comprises a longitudinal supply header 48. This header has a conduit 49 connected thereto and extends to a source of heated air forced into the supply header 48. Longitudinally spaced along the supply header and attached to the wall member 46 are a plurality of anemostats 50. These anemostats serve as a diffuser for the heated air. Thus, heated air is admitted to the anemostat through its collar and projected upwardly and into the central chamber of the preheat oven. As it is projected into the central chamber, the heated air is diffused in four horizontal directions while being forced upwardly toward the top of the central chamber. The heated air is moved vertically throughout the central chamber and across the bottles travelling therethrough.

In the upper wall member 47 is provided, at longitudinally spaced distances, series of openings therethrough (not shown). The space defined by the roof, the upper wall member 47, side walls 43 and end walls 37 and 38 provides a longitudinal exhaust header 52 overlying the central chamber. The exhaust header 52 has an outlet conduit 53 which returns air into the heating system. Adjacent to the upper side of the upper wall member 47 is a plurality of slidable plate members 54 which have corresponding openings registerable with the openings in the wall member 47. Guides are provided in the side walls 43 to hold the plate members 54 and provide a guide for sliding the plates across the wall members 46 to thereby vary the size of the openings and regulate the flow of air from the central chamber to the exhaust header 52. This provides an adjustable damper means for regulating the flow of air through the oven at various longitudinally spaced sections thereof. These dampers may be set to regulate the temperature uniformly throughout the length of the preheat oven.

The bottles are moved from the preheat oven C and brought about the sprockets 40 and through a heat conditioning zone D. In this heat conditioning zone D, localized heat is applied to the skin or surface area of the bottles in addition to the preheat so that the sharp contours of the surface areas of the bottle are differentially heated as needed to raise the bottle surface temperature at those areas over other flatter areas for effecting a controlled coating thickness at those zones of the bottle during dipping.

Referring now to FIGS. 1 and 3, as the bottles are moved in substantially upright position over the sprockets 40 they are carried between radiant heaters 51. The heaters 51 are constructed as plural longitudinally disposed parallel calrod elements held in a frame and curved to conform to the path the bottles travel along the upper side of sprockets 40. The detailed construction and operation of these heaters are fully disclosed in the copending application of John R. Johnson, co-inventor herein, Serial No. 835,358, filed August 21, 1959, now Patent No. 3,060,057. The calrod elements are, in their parallel disposition, located along axially disposed annular surface areas of the bottles on their carriage at this zone D electrically energized so as to vary their heating effect between these annular surface areas of the bottle. Thus, as the bottles are treated in the coating zone E, to be presently described, the sharp contours or corners, such as at the shoulder and bottom, of each bottle, are heated to a higher temperature than the other axially adjacent surface areas of the bottle which are more easily coated to desired thickness under lesser surface heat.

As was mentioned earlier herein, each of the bottle chucks 16 are rotatably mounted in the cross members 15 and drivable for such rotation by a pinion 55 on each of the chucks. As the chucks are carried through the heat cnditioning zone D, the teeth of the chuck pinions 55 mesh with stationary spaced-apart pins 56 mounted in overlying contoured rail 57 fastened in place on the machine frame so that the depending pins 56 will align with the teeth of the pinions in each line of chucks on the carriage and serve as rack gear segments. This is shown on FIG. 3. In the illustration on the drawings, four such rails will be provided to correspond to the illustrated four lines of chucks. Thus, the bottles will all be rotated about their central axis as they are carried between the heaters 51 so that the heat will be applied uniformly in the desired annular areas.

Immediately following this latter-described heating of the bottles, they are moved along to the coating zone E whereat a coating of plastic coating material in flowable condition is applied.

For this purpose, the carriage chains 14 travel in a downwardly inclined path toward elongated dipping tanks 58 prescribed by running on the underside of correspondingly spaced-apart parallel sprockets 59 rotatably mounted on the machine frame by horizontal shaft 60 and end journal bearings 61. As the carriage chains travel around sprockets 59, the bottles are dipped into the bath of the plastic material in the tanks 58. A tank 58 is provided correspondingly for each line of chucks on the carriage, or in the illustrated embodiment of the drawings, a total of four such tanks. Each tank 58 is a two-compartment tank in which the plastic is continually circulated from the top or dipping compartment to the lower compartment and back to the top compartment. The elevation of each of the tanks 58 is adjusted with respect to the bottles on the carriage by their pedestal mountings 62 which may each be operated in unison to raise or lower through their screws 63, worm pinions 64 and worm gears 65. The worm gears 65 are mounted on a common line shaft 66 which is connected to be driven in either direction by reversible electric motor 67. Since the path of the carriage is fixed, the elevation at which the tanks 58 are set will define the height of the coating applied to the bottle during dipping, provided the level of the plastic in the upper compartment of the tanks is constant. At the point where the carriage chains are at the vertical center of the sprockets 59, the bottles are at "full dip" position in the bath of plastic material. This full dip of the bottles is maintained for a span prescribed by a pair of sprockets 68 rotatable on the machine frame on shaft 69 running in its end journal bearings 70.

The bottles are maintained in "full dip" until they are advanced to the center of sprockets 17. Beyond this point, the path of the bottles is inclined upwardly as prescribed by the carriage chains running around the pair of sprockets 71. The sprockets are mounted on a horizontal shaft 72 rotatable in its end journal mountings 73 on the machine frame. As may be seen on FIG. 3, the bottles are gradually removed from "full dip" elevation and raised out of the material in the tank, and thereafter travel for a short distance above the tank.

During the just-mentioned movement of the bottles through the material of the dip tank, they are caused to be rotated at various points about their central axis by rotation imparted to the chucks 16a–16d. To accomplish this rotation, the four rails 57 and their depending pins 56, described above, extend along the path of the pinions 55 of the chucks to impart the needed axial rotation to the bottles up to the point where the bottles drain their excess coating. The pins 56 are here likewise spaced apart to coincide and mesh with the teeth of pinions 55, and may be likened, in effect, to a stationary set of rack gear teeth. As the chucks 16 are advanced past these pins 56 (rack gear teeth), the teeth of the pinion 55 go into mesh with the pins and rotate the body portion of the chucks 16 in their cross members 15, and, in turn, rotate each bottle about their central axis.

As shown on FIG. 3, the pins 56 are located longitudinally of the path of the chucks beginning at the point where the bottles are brought between the heaters 51 (lefthand side of FIG. 3). The rail 57 thus extends from above and between sprockets 40 to a point adjacent sprockets 71. The rail 57 is curved to conform to the path the chuck pinions will take in travel past sprockets 40 and 59. On the drawing, the pins 56 are shown as providing a rack gear for rotating the pinions 55 continuously from the time the bottles are given surface heating at zone D, throughout the "full dip" span of movement, and through a portion of the upwardly inclined travel of the bottles for withdrawing them from the plastic bath. Thereafter, the pins 56 may be disposed at intermittent intervals so as to provide intermittent rack teeth segments which will impart intermittent rotation to the pinions of the chucks.

In the form of the invention illustrated, the intermittent rotation is provided after the bottle has been withdrawn a substantial amount out of the material in the tanks 58 during upwardly inclined movement. Better coatings on certain bottles have been found to result by this technique by elimination of a spiraling effect, which may be described as "barber poling." On certain bottle shapes, however, it is better to rotate continuously from the point the bottles enter the material and including the "full dip" span and thereafter until they are entirely removed from the bath.

In the span of movement throughout dipping of the bottles, after the chains 14 disengage the sprockets 68, they are guided in a fixed path by running in U-shaped guide channels 74 rigidly fastened in place on brackets 75 on the machine frame (shown in FIG. 4). These guide channels 74 terminate as the chains are near engagement with the sprockets 71. After the bottles are removed from the bath of plastic coating material in tanks 58, they travel for a short distance over the tanks and excess material on the coating will run or drain back to the tank until a point of final separation between the draining plastic and the plastic on the bottle. At this point, a tear drop or droplet formation forms near a bottom edge of the bottle which must next be removed or eliminated.

As the carriage chains 14 pass around the sprockets 71, the bottles are rotated about the axis defined by shaft 72 and moved from an upright position at the underside of these sprockets to an inverted position at the upper side of these sprockets. While this latter rotation is taking place, the bottles are simultaneously rotated about their own axes. This is accomplished by the following device. As may be seen in FIG. 3, gears 76 having peripherally spaced pins 77 as teeth are provided and independently rotatable about shaft 72. The gears correspond in number to the lines of chucks on the carriage and each are located so that the pins 77 will mesh with the teeth of the pinions 55 of the chucks. The gears 76 are driven in unison by a connection to a driven sprocket 78. A chain belt 79 provides a driving connection for sprocket 78 from the drive sprocket 80 of a variable speed gear reduction unit 81 operated by a reversible variable speed electric motor 82. The gears 76 may be driven in either direction of rotation and at variable speeds. The gears 76 are rotated by their drive at the desired speed so that the pins 77 move relative to the meshing teeth of the pinions 55, and the pinions will be rotated to impart axial rotation to the bottles. The plastic of the coating on the bottles is still in flowable condition. Thus, as the bottles are rotated axially and carried about the sprockets 71, the droplet formations on the bottles will be smoothed into the plastic of the coating on the bottles.

The just-described mechanism for performing the plural rotations of each of the coated bottles comprises a detearing device and is more fully described in the co-pending application of John R. Johnson, co-inventor herein, Serial No. 835,361, filed August 21, 1959. Other detearing devices are available. One for example is an electrostatic detearing device disclosed in U.S. Patent No. 2,640,459. However, the just-described device is preferred because of its simplicity and mode of operation.

After the coatings have been smoothened on the bottles, the carriage moves the bottles of each line between spaced opposed heaters 83 (shown only on FIG. 3) which may take the form of opposed banks of heating lamps. As the bottles are passed between these heaters, they are rotated by their chucks to apply the heat uniformly. This rotation is accomplished, as seen on FIG. 3, by having rails 84 each provided with spaced apart pins 85 which correspond with the teeth of the pinions 55 of the chucks for meshing engagement with the latter. These pins likewise serve as a stationary rack gear.

During the movement of the bottles throughout detearing, the plastic of the coating may begin to gel, however, after the coating is smoothly distributed on the bottle during detearing, the plastic should be promptly rendered non-flowable. The heaters 83 serve this purpose.

The carriage chains 14 are next reeved about sprockets 86 keyed on their shaft 87. This shaft is rotatably mounted in journal bearings 88 and serves as the main drive shaft for the machine. With reference to FIG. 4, shaft 87 is coupled with a combination speed reduction unit and electric drive motor, shown in outline at 89, operatively mounted on a support 90.

With reference to FIGS. 1 and 4, as the carriage chains travel around the drive gears 86, the bottles on the lines of chucks are brought through the entrance 91 into the the overhead baking oven.

The baking oven has side walls 92, end walls 93 and 94, a roof 95, and a bottom wall 96. The entrance 91 is provided in the bottom wall 96. The oven is supported by the structural frame work 10 and 11 of the machine at a substantial distance above the floor 12. The walls 92–96 are constructed of suitable insulating material, such as a refractory or oven brick, to retain heat within the oven efficiently and insulate it for minimum radiation heat loss.

Within the oven is a longitudinal supply header 97. At longitudinally spaced distances along the supply header 97, are a plurality of anemostats 98, which communicate with the heating chamber of the oven and open downwardly into that chamber for forcing heated air vertically downwardly and distributing it by diffusing the air horizontally in four directions during its downward movement toward the bottom of the chamber. The heated air is circulated across the coated bottles carried longitudinally of the chamber by the carriage. The supply header 97 receives heated air through the two conduits 99 which are connected to the heating system (not shown). At spaced longitudinal distances along the side walls 92 are vertical air return ducts 100 which are provided with openings 101 near their lower end to connect them with the bottom region of central oven chamber. The air-return ducts 100 then extend vertically to near the top of the oven, whereat they are connected into an overhead longitudinal exhaust header 102. The exhaust header 102 is connected outside of the oven by conduits 103.

Adjustable dampers (not shown) may be provided in the air-return ducts 100 for regulating the flow of air through the oven.

The plastic coated bottles are carried through the oven chamber in a reversing path by the carriage chains running over sprockets near opposite ends of the oven chamber, such as sprockets 104 rotatably mounted by the shaft 105 journal mounted near the one end of the side walls 92 by bearings 106 and sprockets 107 rotatably mounted by the shaft 108 journal mounted near the other end of the side walls 92 by bearings 109. Intermediate the sprockets 104 and 107, the chains 14 may ride over longitudinal guides, such as 120, fastened along the inner sides of side walls 92. Beyond the sprockets 107, the chains reverse directions again and travel around sprockets 110 mounted on the shaft 111 rotatable in bearings 112 in side walls 92. In the reversing travel about sprockets 110, the bottles are carried through the exit 113 in the bottom wall 96 of the oven.

During travel through the oven, as described, the coated bottles are heated to form a fused coating. At this point, finished coated bottles having a plastic coating tenaciously adhered or bonded to the primed surface areas of the glass will be produced.

After the fused coated bottles are removed from the baking oven through its exit 113, they are cooled to handling temperature. Adjacent the underside of the bottom wall 96 of the baking oven is an elongated longitudinally disposed cooling tunnel 114 which has an entrance coextensive with the exit 113 from the overhead oven. The carriage chains will then bring the finished bottles through the cooling tunnel 114. At the end of the tunnel opposite the mentioned entrance is an exit opening through which the carriage means advances the articles and brings them about sprockets 115 mounted on the shaft 116 rotatable in end bearings 117 on the structural frame 10. Cooling wind is forced into the cooling tunnel through the pipe inlet 118 located adjacent the exit end of the cooling tunnel. The cooling wind may be supplied by any conventional means, such as a blower (not shown), and the wind thus supplied is forced to flow counter to the movement of the articles as they are carried along the tunnel 114.

Beyond the sprockets 115, the carriage chains 14 again run on the sprockets 18, previously described, and bring the finished coated bottles to the unloading zone at A whereat the chucks are each opened automatically and the bottles removed and packed. Other glass bottles are loaded in their place and the process repeated.

Having described the structural details of the machine, the following is included, by way of example, operating conditions in practicing the process for satisfactory manufacture of vinyl resin-coated glass bottles.

First, the glass bottles were loaded to the chucks on the movable carriage and successively advanced through the bath of the primer described earlier herein kept at a temperature of about 92° F. and viscosity of about 14 centipoises and, thusly, coated the bottles with the primer material. In the preheat oven, the temperature of the bottles was increased to about 235° F. The linear speed of the carriage chains was constant at about 6.7 feet per minute. The bottles were advanced beyond the preheat oven and through the surface heaters. The surface heat was applied, as needed, for conditioning sharp contours of the particular bottle shape being coated. Thereafter, they were dipped in a polyvinyl chloride dispersion or plastisol kept at about 85° F. and about 8,000 centipoises. A typical plastisol is one comprised of 100 parts of polyvinyl chloride (Geon 121), 80 parts diisooctyl phthalate, 1 part tin mercaptide and pigments to impart a desired color to the finished coating. The bottles, after introduction into the plastisol bath, moved therein at a slightly faster speed than the circulatory movement of the plastisol material within the tank. The bottles during dipping were rotated and handled as described previously herein. A thickness of coating of about 0.050 inch was obtained, which is satisfactory for a glass aerosol type container. The coated bottle, after being moved from the bath, had excess material drained from the material of the coating and that coating smoothed (deteared) before the coating set to an attractive smooth outer coating surface for the bottles. The coated bottles were then fused by travel in the baking oven over a period of about ten minutes, the oven temperature being between 300–400° F. After fusing the coatings, the finished bottles were cooled to about 100° F. and unloaded from the machine. The fused coating tenaciously adhered to the glass, as indicated by its peel strength of about 40 lb./in.

As was stated earlier herein, the invention may be employed by priming only selected surface areas of the bottle. This may be accomplished in a number of ways, such as by two-stage dipping with an invert in between so as to leave an annular area of the bottle unprimed. Or, the primer may be applied by brushing or controlled spraying. Or, the primer may be applied as disclosed earlier herein after the bottle has undergone a preliminary treatment by masking an area of the bottle to be excluded from the mentioned selected surface area to be primed. This masking may be accomplished, for example, by applying a band of tape, or by brushing or rolling on a band of a material that will act as a barrier for the primer to the glass, such as a glycerin composition, a paraffin or a polyethylene, as will now be described in connection with FIG. 5.

The bottles 17 are chucked at their neck opening by the freely rotatable arbor 125 and at their bottom by a base chuck member 126. The base chuck 126 and arbor 125 are mounted coaxially in a frame (not shown), the base chuck being mounted on a shaft 127. This latter shaft is motor driven, as indicated by the arrow. On shaft 127 is a pulley 128 used to transmit rotation to another shaft 129 through the belt 130 running over pulley 128 and a pulley 131 on the one end of shaft 129. The shaft 129 is journal mounted in casting 132, which may be part of the frame. At the other end of shaft 129 is a transfer wheel 133 which has its peripheral surface running in a bath of liquid barrier material P, to be presently discussed. The liquid P is held in a supply basin 137. Above transfer wheel 133 is an applictor wheel 134 rotatable on a pivot 135 integral with a mounting arm 136. The applicator wheel 134 has its peripheral surface in contact with the transfer wheel 133 and also in contact with the neck portion of bottle 17. Thus, as the bottle is rotated about its axis, the barrier material P is applied from the basis to the applicator wheel by the transfer wheel and onto the bottle in the form of a band about the neck.

One example of barrier material which has been successfully employed is a mixture comprised of a thickened emulsion of polyethylene prepared by mixing polyethylene with potassium hydroxide and oleic acid and thickened by the addition of an aqueous solution of a sodium salt of polyacrylic acid. The emulsion can be prepared to the proper viscosity for suitable application to the bottle by use of the above-described apparatus or by other suitable applicator apparatus, such as a brush, etc.

The foregoing description presents a detailed disclosure of a preferred embodiment of the invention. It will, of course, be understood that various details may be modified through a wide range without departing from the principles of this invention, and it is, therefore, not the purpose to limit the patent granted hereon otherwise than necessitated by the scope of the appended claims.

We claim:

1. A machine for coating glass bottles with a plastic material, comprising in combination a bottle loading station, a first dipping tank for containing a bath of a liquid primer material, a first oven chamber, a radiant heater defining a tunnel-like heating zone, a second dipping tank for containing a bath of a liquid plastic coating material, a detearing device, a second oven chamber, a cooling chamber, a bottle unloading station, a pair of parallel endless carriage chains, a plurality of rotatable bottle-carrying chucks, means for mounting said chucks for carriage intermediate said carriage chains, means, including a plurality of pairs of sprockets, defining an endless path for movement of said carriage chains, said defined endless path extending through the machine for carrying said chucks in succession past said first dipping tank for dipping bottles on said chucks in said bath of primer material, through said first oven for preheating the primed bottles, through said radiant heater zone for externally heating bottles on said chucks, past said second dipping tank including an initial, downwardly inclined travel for dipping bottles on said chucks into the said coating material by introducing them into said plastic material with their axes inclined to the surface of the bath and then gradually uprighting the articles to a vertical full dip position in the bath, and a subsequently, upwardly inclined travel for gradually removing dipped bottles from said coating fluid and including a span of travel above said body of coating fluid sufficient to allow excess coating material to drain from the bottles, past said detearing device while continuously moving the articles from an inclined upright position to an inverted position and coincident with said inverting movement said detearing device drivably engaging said chucks thereby continuously rotating the bottles axially for smoothing the coating on the dipped bottles during their said inverting movement heating means mounted at the terminal end of said inverting movement for applying heat to the coatings on the bottles as they complete their said inverting movement, said path then extending through said second oven for fusing the applied coating on the bottles, and through said cooling chamber, and drive means operatively connected for continuously driving one of said pairs of sprockets for continuously moving said carriage chains.

2. A machine for coating glass bottles with a plastic composition, comprising in combination a first dipping tank containing a bath of a liquid primer material, a first oven chamber, opposed banks of radiant heaters defining a tunnel-like heating zone, a second dipping tank containing a bath of a liquid coating material, a detearing device, a second oven chamber, a cooling chamber, a pair of parallel endless carriage chains, a plurality of rotatable bottle-carrying chucks, means for rotatably mounting said chucks at spaced points for carriage intermediate said carriage chains for rotating bottles carried thereby about their central axis, means including a plurality of pairs of sprockets, defining an endless path for said carriage chains, said path extending for carrying said chucks in succession past said first dipping tank for dipping bottles on said chucks in said bath of primer material, through said first oven for preheating the primed bottles, past said opposed radiant heater banks for surface heating bottles on said chucks, past said second dipping tank including an initial, downwardly inclined travel for dipping bottles on said chucks into the said coating material by introducing them into said plastic material with their axes inclined to the surface of the bath and then gradually uprighting the articles to a vertical full dip position in the bath, and a subsequently, upwardly inclined travel for gradually removing dipped bottles from said coating fluid and including a span of travel above said body of coating fluid sufficient to allow excess coating material to drain from the bottles, past said detearing device while continuously moving the articles from an inclined upright position to an inverted position and coincident with said inverting movement said detearing device drivably engaging said chucks thereby continuously rotating the bottles axially for smoothing the coating on the dipped bottles during their said inverting movement, means mounting plural spaced, opposed heaters along the path of the bottles at the terminal portion of their said invert movement, said path thereafter extending through said second oven for fusing the applied coating on the bottles, and through said cooling chamber, means operable along said upwardly inclined travel of the carriage chain in its said path past said radiant heater and past said second dipping tank engageable with said bottle chucks for rotating the bottle chucks each about the axis of its bottle thereon, and drive means operatively connected for continuously driving one of said pairs of sprockets for continuously moving said carriage chains.

3. The machine defined in claim 1, wherein is provided means operatively engageable with the chucks for axially rotating them and bottles held thereby during their said movement past the heating means at the said terminal end of the inverting movement.

4. The machine defined in claim 3, and including means along the endless path for movement of the carriage chains past said second dipping tank engageable with the bottle chucks for rotating them during their said movement of the bottles in the bath of plastic material and during at least a portion of said movement of the bottles in the said inclined travel.

References Cited by the Examiner

UNITED STATES PATENTS

| | | | |
|---|---|---|---|
| 2,411,042 | 11/1946 | King et al. | 118—64 |
| 2,714,871 | 8/1955 | Speed et al. | 118—643 X |
| 2,755,205 | 7/1956 | Robb et al. | 118—423 X |
| 2,755,507 | 7/1956 | Heller | 118—423 X |
| 2,981,639 | 4/1961 | Kachele | 117—113 |
| 3,004,516 | 10/1961 | Marsden et al. | 118—423 X |
| 3,011,914 | 12/1961 | Pflug | 118—423 |

MORRIS KAPLAN, *Primary Examiner.*